(12) United States Patent
Li et al.

(10) Patent No.: US 9,336,298 B2
(45) Date of Patent: May 10, 2016

(54) DIALOG-ENHANCED CONTEXTUAL SEARCH QUERY ANALYSIS

(75) Inventors: Shipeng Li, Palo Alto, CA (US); Ye-Yi Wang, Redmond, WA (US); Xiaochuan Ni, Beijing (CN); Jian-Tao Sun, Beijing (CN); Zheng Chen, Beijing (CN); Zhimin Zhang, Beijing (CN); Xiaolong Li, Sammamish, WA (US); Xuedong Huang, Bellevue, WA (US); Li Jiang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 13/162,337

(22) Filed: Jun. 16, 2011

(65) Prior Publication Data

US 2012/0323948 A1    Dec. 20, 2012

(51) Int. Cl.
*G06F 17/30* (2006.01)

(52) U.S. Cl.
CPC ................. *G06F 17/30643* (2013.01)

(58) Field of Classification Search
CPC ................................................. G06F 17/30643
USPC ........................................ 707/705, 708, 765
See application file for complete search history.

(56) References Cited

U.S. PATENT DOCUMENTS

| 6,829,603 | B1 * | 12/2004 | Chai | G06F 17/30684 |
| 2002/0168664 | A1 * | 11/2002 | Murray | G06F 19/28 435/6.14 |
| 2003/0217052 | A1 * | 11/2003 | Rubenczyk | G06F 17/30643 |
| 2004/0030556 | A1 | 2/2004 | Bennett | |
| 2006/0155398 | A1 * | 7/2006 | Hoffberg | G05B 15/02 700/86 |
| 2006/0288023 | A1 * | 12/2006 | Szabo | G06F 17/30067 |
| 2007/0156677 | A1 * | 7/2007 | Szabo | G06F 17/30522 |
| 2010/0211605 | A1 | 8/2010 | Ray | |
| 2010/0274770 | A1 * | 10/2010 | Gupta et al. | 707/688 |
| 2011/0106828 | A1 * | 5/2011 | Mauge | G06F 17/2795 707/765 |
| 2011/0173216 | A1 * | 7/2011 | Newman | G06F 17/30867 707/765 |

OTHER PUBLICATIONS

Minwoo Jeong, et al., "Practical Use of Non-local Features for Statistical Spoken Language Understanding", Reprint submitted to Elsevier, Published Jul. 4, 2007, 36 pages, http://citeseerx.ist.psu.edu/viewdoc/download?doi=10.1.1.126.8060&rep=rep 1 &type=pdf.

Teruhisa Misu, et al., "Bayes Risk-based Dialogue Management for Document Retrieval System with Speech Interface", Coling 2008: Companion volume, Posters and Demonstrations, pp. 59-62, Manchester Aug. 2008, http://www.ar.media.kyoto-u.ac.jp/lab/bib/intl/MIS-COLING08.pdf.

(Continued)

*Primary Examiner* — Huawen Peng
(74) *Attorney, Agent, or Firm* — Dave Ream; Tom Wong; Micky Minhas

(57) ABSTRACT

Embodiments of the present invention relate to systems, methods, and computer-storage media for a method of contextually analyzing terms within a search query. In one embodiment, a received search query is classified into a domain category. Additionally, information is assigned to a schema associated with the domain by analyzing the search query. Further, at least one search result that helps a user complete a task within the domain is provided based on the information in the schema.

20 Claims, 8 Drawing Sheets

(56) References Cited

OTHER PUBLICATIONS

Stephanie Seneff, et al., "Exploiting Context Information in Spoken Dialogue Interaction with Mobile Devices", Published 2007, 11 pages, http://groups.csail.mit.edu/sls/publications/2007/imux2007-mobile.pdf.

Shun-Zheng Yu, "Hidden semi-Markov Models", Elsevier Artificial Intelligence 174 (2010) 215-243, Published Nov. 17, 2009, 29 pages, https://people.cs.ubc.ca/-murphyk/Teaching/CS540-Spring10/projects/Yu-hsmm09.pdf.

Geoffrey Zweig, et al., "A Segmental CRF Approach to Large Vocabulary Continuous Speech Recognition", Published 2009, 6 pages, http://research.microsoft.com/pubs/102642/scarf_asru09.pdf.

inQuira, "Intelligent Search for InQuira 7", Improving the Quality of Customer Interactions with Intelligent Search, Retrieved Sep. 27, 2010, 4 pages, http://www.inquira.com/pdf/inq7/inq_ds_intellisearch.pdf.

* cited by examiner

FIG. 5

```
┌─ 500 ─────────────────────────────────────────┐
│ OUTLINE MOVIE APPLICATION          _ ☐ ✕      │
│                                                │
│  BUY TICKETS ONLINE                            │
│  MOVIE                    [TOY STORY 3    ▽] ~510
│  LOCATION                 [BELLEVUE       ▽] ~512
│  NEAR ZIP                 [              ]  ~514
│  PICK THEATER             [              ]  ~516
│  PICK DATE                [AUGUST 8, 2010 ]  ~518
│  PICK SHOWTIME            [              ]  ~520
│  NUMBER OF ADULTS         [              ]  ~522
│  NUMBER OF CHILDREN/SENIOR[              ]  ~524
│                              [ CHECK OUT ]  ~530
└────────────────────────────────────────────────┘
```

FIG. 6

Window 500 — OUTLINE MOVIE APPLICATION

- BUY TICKETS ONLINE
- MOVIE: TOY STORY (510)
- LOCATION: BELLEVUE (512)
- NEAR ZIP: (514)
- PICK THEATER: (516)
- PICK DATE: AUGUST 8, 2010 (518)
- PICK SHOWTIME: (520)
- NUMBER OF ADULTS: 2 (522)
- NUMBER OF CHILDREN/SENIOR: 3 (524)
- CHECK OUT (530)

DIALOG-ENHANCED CONTEXTUAL SEARCH QUERY ANALYSIS

BACKGROUND

The ability to provide responsive search results has become increasingly important to search engine providers as users rely more heavily on search engines as their primary source of information. The better that search engine providers are at providing search results to a user, the more likely the user will interact with search results provided in response to a search query. This, in turn, gives search engine providers more leverage to request more money from advertisers. As such, search engine providers are continually looking for ways to improve the responsiveness of search results to a search query.

SUMMARY

This Summary is provided to introduce a selection of concepts in a simplified form that are further described below in the Detailed Description. This Summary is not intended to identify essential features of the claimed subject matter, nor is it intended to be used as an aid in isolation to determine the scope of the claimed subject matter. Embodiments of the present invention provide methods for contextually analyzing terms within a search query. In particular, methods are provided for classifying a search query into an intent category. Once the search query has been classified into an intent category, descriptors are assigned to terms within the search query based on the intent category. Additionally, once descriptors have been assigned to terms of a search query, search results may be provided based on the descriptors assigned to the terms of the search query.

Embodiments of the present invention provide domain specific search results that help a user complete a task within the domain. A query may be classified into a subject matter domain. Then, classifiers that are specifically adapted to work within the domain, analyze the query text to extract entities and assign values to a domain schema using the entities. The domain schema contains fields to hold information provided by users in a query and that can be consumed by search application to provide the relevant results.

BRIEF DESCRIPTION OF THE DRAWINGS

Embodiments of the invention are described in detail below with reference to the attached drawing figures, wherein:

FIG. 5 is a schematic diagram that illustrates an application that uses information within a domain schema, in accordance with an embodiment of the present invention;

FIG. 6 is a schematic diagram that illustrates an application that uses updated information within a domain schema, in accordance with an embodiment of the present invention;

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of embodiments of the invention may be described in the general context of computer program products that include computer code or machine-useable instructions, including computer-executable instructions such as applications and program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Figure 1:
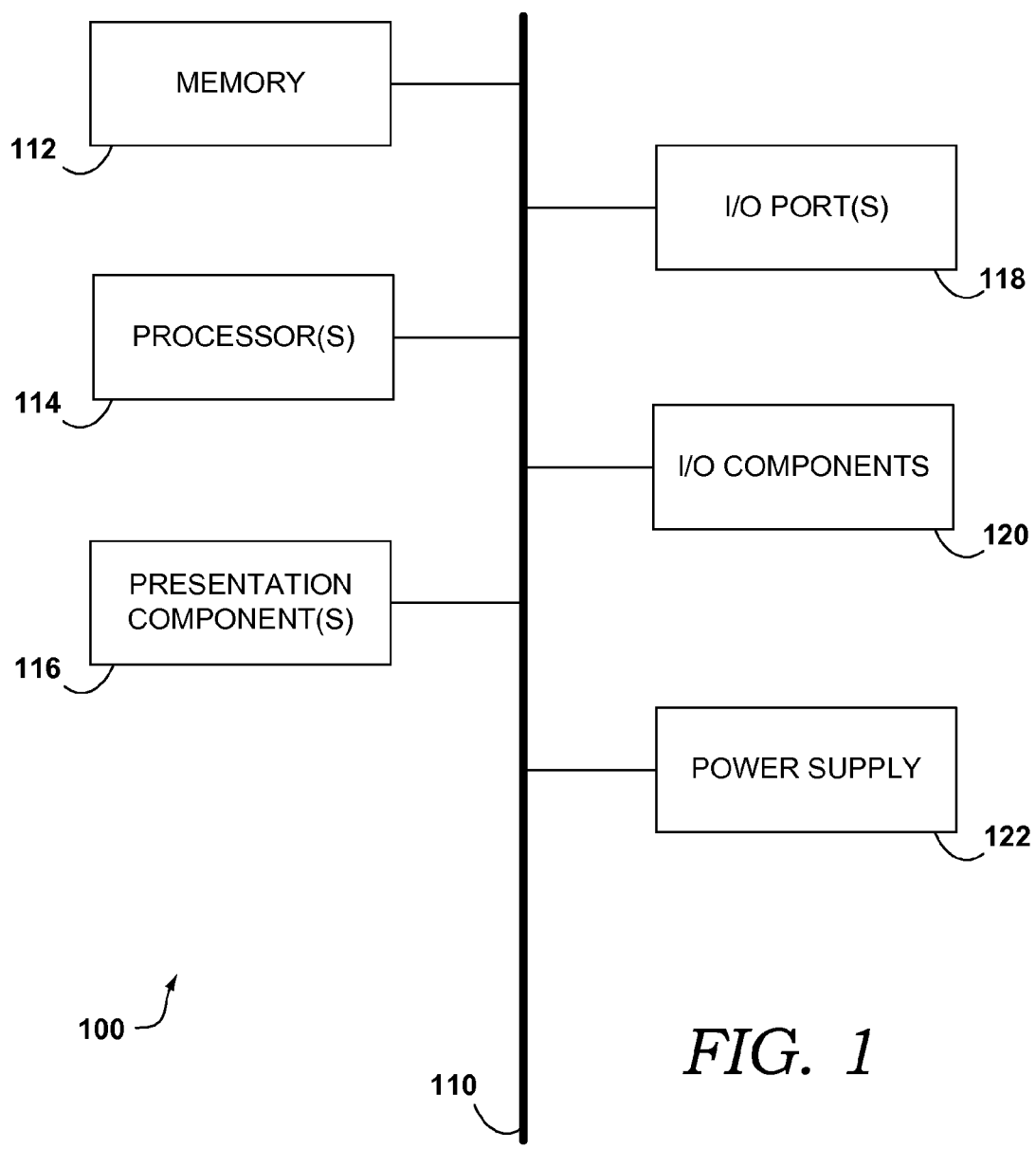
FIG. 1 is a block diagram illustrating an exemplary computing device suitable for use in connection with embodiments of the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG.

1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," "mobile device," "PDA," "smart phone," etc., as all are contemplated within the scope of FIG. 1 and reference to "computing device."

Additionally, computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data.

Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer-storage media are non-transitory. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-executable instructions 113 stored in volatile and/or nonvolatile memory. The memory may be removable, nonremovable, or a combination thereof. Exemplary hardware devices include solid-state memory, hard drives, optical-disc drives, etc. Computing device 100 includes one or more processors 114 coupled with system bus 110 that read data from various entities such as memory 112 or I/O components 120. In an embodiment, the one or more processors 114 execute the computer-executable instructions 113 to perform various tasks and methods defined by the computer-executable instructions 115. Presentation component(s) 116 are coupled to system bus 110 and present data indications to a user or other device. Exemplary presentation components 116 include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse. I/O components 120 can also include communication connections 121 that can facilitate communicatively connecting the computing device 100 to remote devices such as, for example, other computing devices, servers, routers, and the like.

Figure 2:
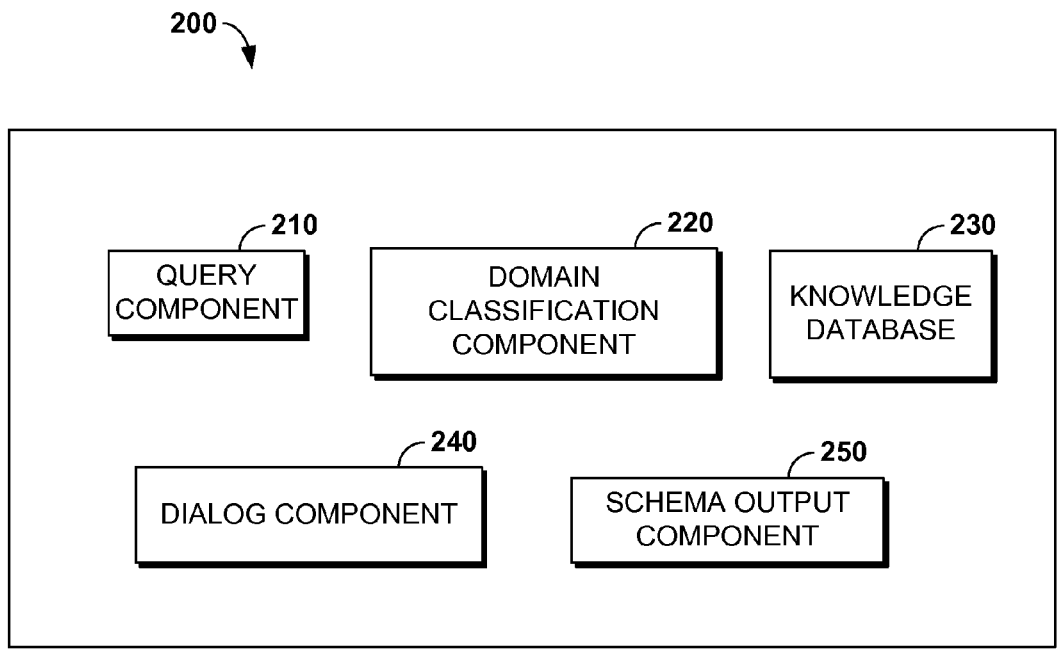
FIG. 2 is a schematic diagram illustrating an exemplary system for contextually analyzing terms within a search query, in accordance with an embodiment of the present invention.

FIG. 2 is a schematic diagram illustrating an exemplary computing system architecture 200 for providing responsive results to a search query, in accordance with an embodiment of the present invention. The computing system architecture 200 shown in FIG. 2 is an example of one suitable computing system architecture 200. The computing system architecture 200 runs on one or more computing devices similar to the computing device 100 described with reference to FIG. 1. The computing system architecture 200 should not be interpreted as having any dependency or requirement related to any single module/component or combination of modules/components illustrated therein. The computing system architecture 200 comprises a query component 210, a domain classification component 220, a knowledge database 230, a dialog component 240, and a schema output component 250.

Query component 210 receives a search query. The query component 210 may receive the search query from a search engine. The query component 210 may be responsible for generating a search interface that receives the query. The query may be described as received from a user throughout this description. This means that a user composed the query. The query may be received indirectly by the query component 210 after the query is processed or handled by other components.

The domain classification component 220 analyzes the query to determine a domain for the query. A domain is a subject-matter category, like movies, restaurant, or travel. The domain includes multiple intents or tasks that are more specific. The task or intent is related to what the user intends to accomplish through the search session. For example, within the restaurant domain, tasks include making a reservation, finding a restaurant near a location, finding directions to a particular restaurant, and ordering carryout. The domain determination component may use a statistical classifier to analyze the search query and assign the query to a domain.

In addition, the domain classification component 220 may analyze the search query in light of past queries and intents received during the same search session. A search session is a group of one or more searches related to accomplishing the same task. As a threshold matter, when new queries are received the domain determination component may first determine whether the new query is part of an ongoing search session or marks the beginning of a new search session. The domain classification component 220 may utilize a Markov model to determine whether a search session transition has occurred. Within the Markov model each search session may be associated with a different state. When states change, a new search session begins.

The dialog component 240 analyzes the search terms and other information received from a user to fill slots in a domain schema. The dialog picks a schema that is specific to the domain into which the search query was classified. The schema contains slots describing a task a user may perform through the search session. For example, a schema specific to the restaurant domain may contain slots for a reservation time, number of people, and restaurant name. The dialog component 240 may generate a session record. The session record records information from queries that are received during a search session. Further, as information is added to slots in the domain specific schema, the meaning of previously submitted ambiguous information may become clear. The information may be stored in the session record and latter added to a schema. Session records may store search queries, "Q1"-"Qn," in association with schema information "D1"-"Dn." As such, when the search query "Qn+1" is received, schema information "Dn+1" may be determined.

The knowledge database 230 provides information that helps dialog component 240 or the domain classification component 220 function. In particular, knowledge database 230 may comprise lexicons with entity lists with or without weights or normalization. A lexicon may contain specific domain knowledge such as a restaurant lexicon that includes names of restaurants and ngram counts for the names. If a rare ngram occurs in the search result, then a strong possibility exists that a specific restaurant associated with the ngram is intended. The knowledge database 230 may also include grammar rules and linguistic services. For example, the grammar rules may identify verbs, which tend not to be entities. Similarly, words like "of," "to," and "would" could be excluded from analysis. Other parts of speech can be identified in a natural language query. Other concepts associate terms like Black Friday with a particular date (e.g., the day after Thanksgiving in the current year).

The schema output component 250, shares information within an active schema with the search engine or search applications. These applications consume the information to provide relevant search results that help the user complete a task.

Figure 3:
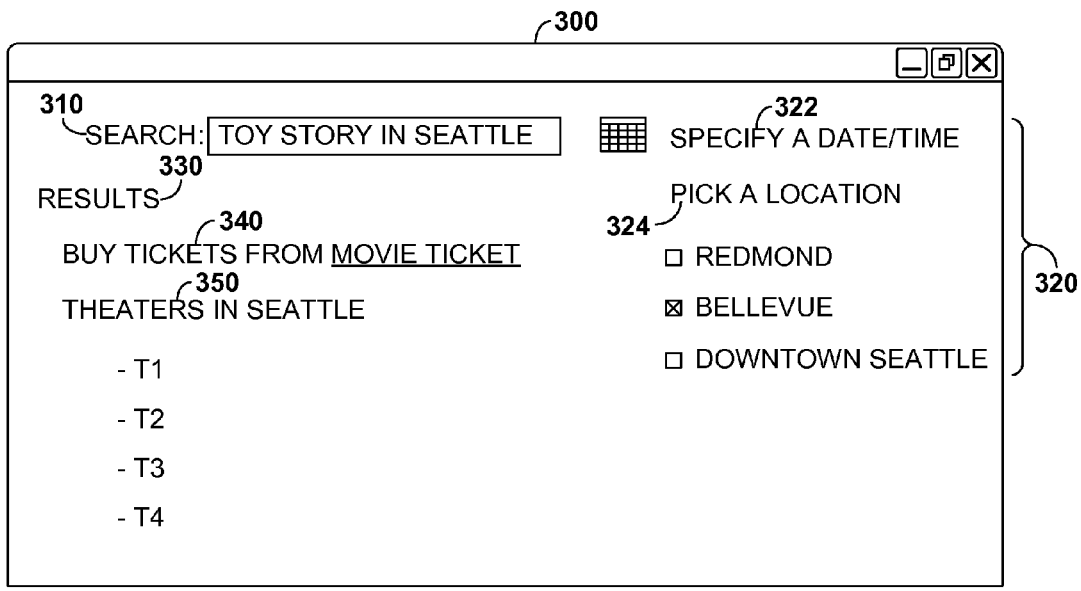
FIG. 3 is a schematic diagram illustrating a search interface with a dialog feature, in accordance with an embodiment of the present invention.

Turning now to FIG. 3, a diagram showing a search interface 300 with a dialog feature 320 is provided, in accordance with an embodiment of the present invention. The search interface 300 may be generated as part of an online search engine. The search interface 300 includes a query input 310. The query input 310 includes a query "Toy Story in Seattle." Upon receiving this search query, various processes may occur to populate search result area 330 and the dialog feature 320. For example, the domain of the search query may be determined. In one embodiment, the domain classification component 220 determines the domain of the query. As described previously, a domain is a subject-matter category. Multiple tasks can be performed within the domain. For example, within the restaurant domain, a user may wish to make a reservation, find directions to a restaurant, find a restaurant of a particular genre, find a restaurant near a particular location, find a restaurant menu, order carryout, or other tasks. The domain classification places the search query into a domain that includes all of these potential tasks. The query may be classified into a domain using a statistical classifier that generates a probability that the search query is within a particular domain. The query may be assigned to the domain with the highest probability. For example, the query "Toy Story in Seattle," could be classified into the movie domain based on the name "Toy Story." However, it could also be classified as online shopping, or toys, if the user intends to purchase a "Toy Story" toy. In the example shown, the search query, "Toy Story in Seattle," is classified in the domain movie.

Once the query is classified into a domain, a schema associated with the domain may be retrieved. The schema includes multiple slots, or fields, into which data or information can be stored. As described previously, the slots in the domain may be filled by the dialog component 240. In this case, the movie schema includes a slot for a movie title. The movie title in this case may initially be determined as "Toy Story" based on a grammatical analysis of the search query using a machine-learning algorithm. Initially, the search query may be broken down into entities. An entity may be a word, series of words, groups of words, or a group of characters. For example, a query could be broken down into a series of unigrams, bigrams, and trigrams that are analyzed for their meaning The unigrams, bigrams, and trigrams are compared with query log data or training data that has been assigned a meaning. Similar patterns of entities within the query can be assigned the meanings associated with the training data.

At this point, a knowledge base may also be consulted to determine whether "Toy Story" is the exact title of a movie. The knowledge base for the movie domain may include a list of movie titles. More broadly, the knowledge base may be used to disambiguate entities extracted from the query. The knowledge base may determine that there are in fact three Toy Story movies, each with slightly different titles. Further, the knowledge base may realize that "Toy Story 3" is the only movie currently being shown in theaters. Upon making this determination, the slot within the schema related to movie title may be filled with "Toy Story 3." It should be noted, that the knowledge base may first rely on the domain determination. For example, once the query has been classified within the movie domain, the knowledge base may focus on disambiguating terms in such a way that they relate to search applications within the movie domain. For example, applications within the movie domain may be able to help a user buy a movie ticket, find theater times, or perform another action related to actually seeing a movie currently in theaters. Thus, the disambiguation may favor currently available movies, since the search applications provide services that only relate to movies currently shown in theaters. In contrast, had the query initially been classified as shopping, the knowledge base may have disambiguated the term differently or instead filled the schema with three different movie titles "Toy Story 1," "Toy Story 2," and "Toy Story 3" to facilitate the user finding DVDs or performing other shopping tasks. Accordingly, the knowledge base may function in conjunction with the domain determination.

The search term "Seattle" may be inserted into the slot associated with a geographic location. The knowledge base may then retrieve theaters in Seattle and/or within the Seattle, Washington, metropolitan area. At this point, the knowledge base may draw on other information about a user to refine a location. For example, if specific GPS information for the user's current location is available, then geographic locations within Seattle or within Seattle's metropolitan area nearest that location may be added to the slot. In this case, the slot could be filled with a zip code near that location. Similarly, information from a user's profile may be used to further refine the geographic location. For example, if the user's home is known to be located in a certain portion of Seattle, then that portion may be inserted into the geographic location even though the search term was broader. In another example, an IP address could be used to disambiguate a geographic term, such as "Columbus," which is a name associated with multiple cities throughout the United States.

The search interface 300 shows the dialog feature 320. The dialog feature 320 includes a date interface 322 that allows a user to specify a date and/or time. The dialog feature 320 also includes a location input 324 that allows a user to specify a specific location. The location interface 324 shows three different choices related to the present location within the schema, "Seattle." In this case, the user has selected Bellevue, which is a city near Seattle, Washington. The information from the dialog feature 320 is then inserted into the active schema. For example, Bellevue replaces Seattle in the geographic location slot. Further, a date or time may be added to the schema based on the information provided by the user.

The search interface 300 also includes a search results area 330. The search results may be generated by search algorithms typically run on a search engine based on the query received in the query input 310. Other information about the user and the domain determination may be used to present the search results. The first search result 340 links to an application that allows a user to purchase a movie ticket. The second search result 350 lists a series of theaters in Seattle, which are represented at T1-T4. Other search results such as movie reviews for "Toy Story 3" could be shown.

Figure 4:
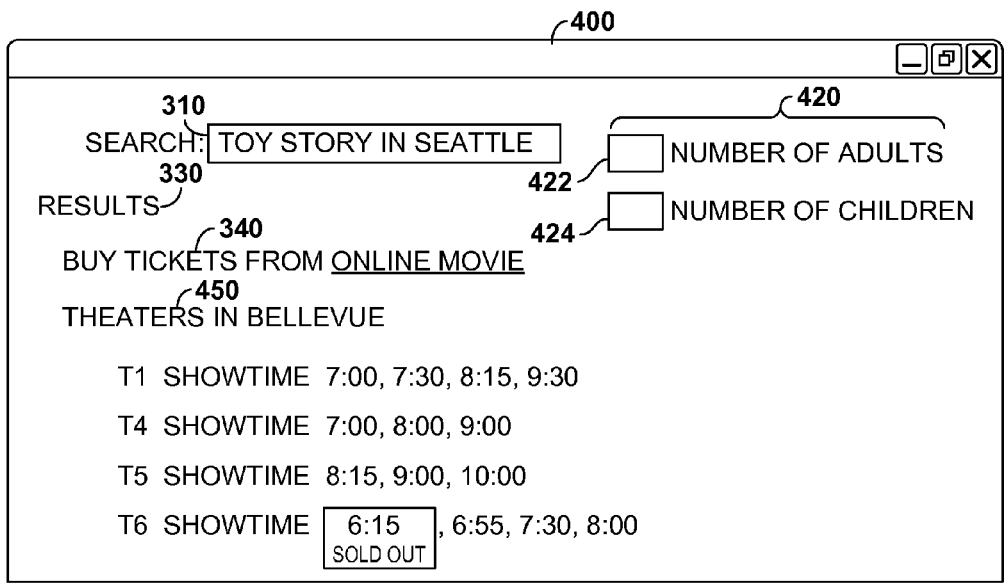
FIG. 4 is a schematic diagram illustrating a search interface with an updated dialog feature, in accordance with an embodiment of the present invention.

Turning now to FIG. 4, updated search results and an updated dialog feature 420 are shown in updated search interface 400, in accordance with an embodiment of the present invention. As can be seen, the same query, "Toy Story in Seattle" is shown in the updated search interface 400. This illustrates, that a new search query had not been received. However, the search results in search results area 330 have been updated based on the information received in the dialog feature 320 in FIG. 3. In addition, the dialog feature 420 has been updated to request new information. The search results area 330 shows search result 340, which asks a user to buy tickets through an application. Search result 450 is now more specific than search result 350 and shows theaters near Bellevue, rather than theaters in Seattle. In this case, T1 is the same theater but T4, T5, and T6 are new theaters. T1 remains because T1 was near Bellevue whereas T2, T3, and T4 were further from Bellevue than theaters T4, T5, and T6. In addition to showing the theaters, show times for "Toy Story 3" are also shown as part of the search results, since a time or date of interest was specified through dialog feature 320. These search results may be generated by a movie show time application that generates specialized search results. The show times are selected based on a date and/or time specified through the dialog feature 320.

The dialog feature 420 requests the number of adults 422, and the number of children 424 going to a movie. This information is requested to help facilitate purchasing a specific number of tickets. The dialog feature 420, may request this information because the slots associated with this information are empty in the current schema. The dialog feature 420 may request information in an order in which users typically specify or provide this relevant information. This order may be determined by analyzing a series of query logs within the movie domain. Each query is analyzed to determine the frequency with which certain information is provided. Information provided more frequently may be requested before information that is submitted less frequently. Further, the order in which information regarding movies is typically submitted by a user may be considered.

Turning now to FIG. 5, an application interface 500 that uses information within the movie schema to help a user to complete a task is shown, in accordance with an embodiment of the present invention. The application interface 500 is associated with a movie ticket application that allows a user to buy tickets for a movie online. As can be seen, the movie title "Toy Story 3," is prepopulated into the movie title field 510. Similarly, the location of Bellevue is prepopulated into the location field 512. Application interface 500 also specifies the date of interest as Aug. 8, 2010, within field 518. Overall, the information prepopulated into application interface 500 is based on the information in the schema after information has been entered into dialog feature 320 in FIG. 3.

Information may be added to other fields within application interface 500 to help complete the movie ticket purchase. Other fields include a zip code field 514, a preferred theater field 516, a show time field 520, a number of adults field 522, and a number of children/senior field 524. Once the necessary information is included within these fields, the user may proceed to a checkout by pushing the "checkout" button 530.

The application interface 500 may share a bidirectional relationship with the dialog component 240. For example, information provided to application interface 500 may then be used to populate slots within a schema. Embodiments of the present invention do not require that the relationship be bidirectional. In one embodiment, information is provided from the schema to the application and not vice versa.

Turning now to FIG. 6, it can be seen that additional information is prepopulated into application interface 500 based on information received through dialog feature 420. In this case, the number of adults is specified in field 522 as 2 and the number of children specified as 3 in field 524. Thus, FIG. 6 shows the application interface 500 as it would appear if the user selected search result 340 in FIG. 4 after entering information into the dialog feature 420. FIGS. 5 and 6 illustrate that different amounts of information may be provided to an application for consumption.

Figure 7:
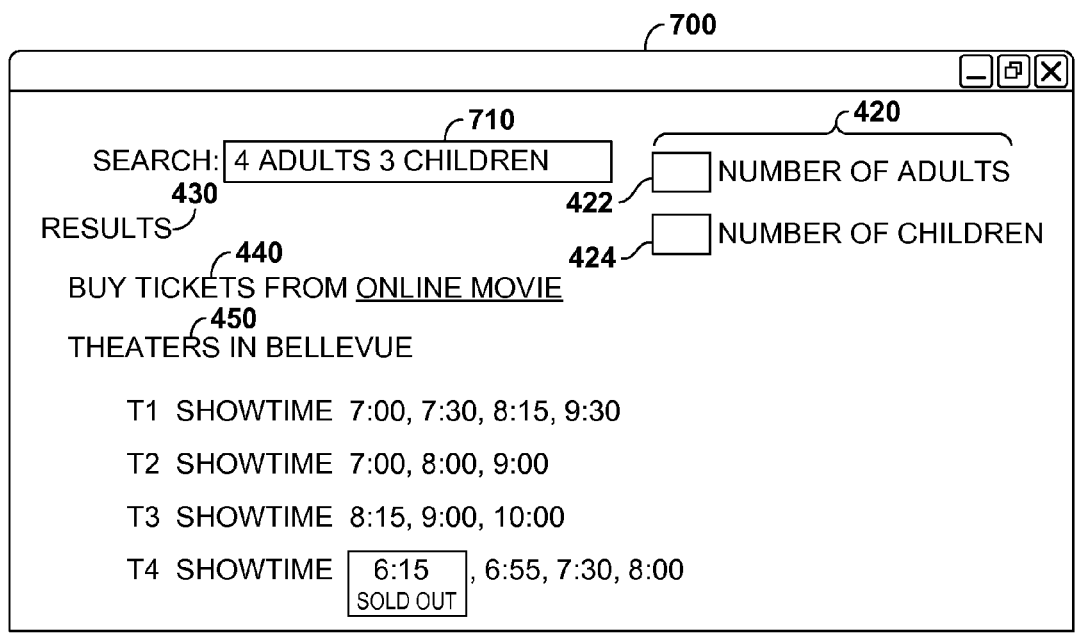
FIG. 7 is a schematic diagram illustrating a updated search interface with a dialog feature, in accordance with an embodiment of the present invention.

Turning now to FIG. 7, a search interface 700 that illustrates a dialog conducted through a series of search inputs is shown, in accordance with an embodiment of the present invention. Search interface 700 is, in many respects, similar to search interface 400 described previously. As can be seen, the search input 710 shows "4 adults, 3 children." This is also the information asked for within dialog feature 420. This illustrates that a series of search queries may function as a dialog. A user may submit one query after another and information from the queries can be populated into slots within an active schema. When multiple queries are used to conduct a dialog, a threshold determination is made whether subsequently received queries are part of the same search session. Queries that fall within the same domain may be determined to be part of the same search session. In addition, the sequence of information typically provided by users when completing a task within the domain may be considered to determine whether the additional information falls into categories of information typically provided. If not, then a new search session may be started based on a new domain determination. In the case shown, the slots in the active movie schema for a number of adults and number of children could be filled after interpreting the new query.

Figure 8:
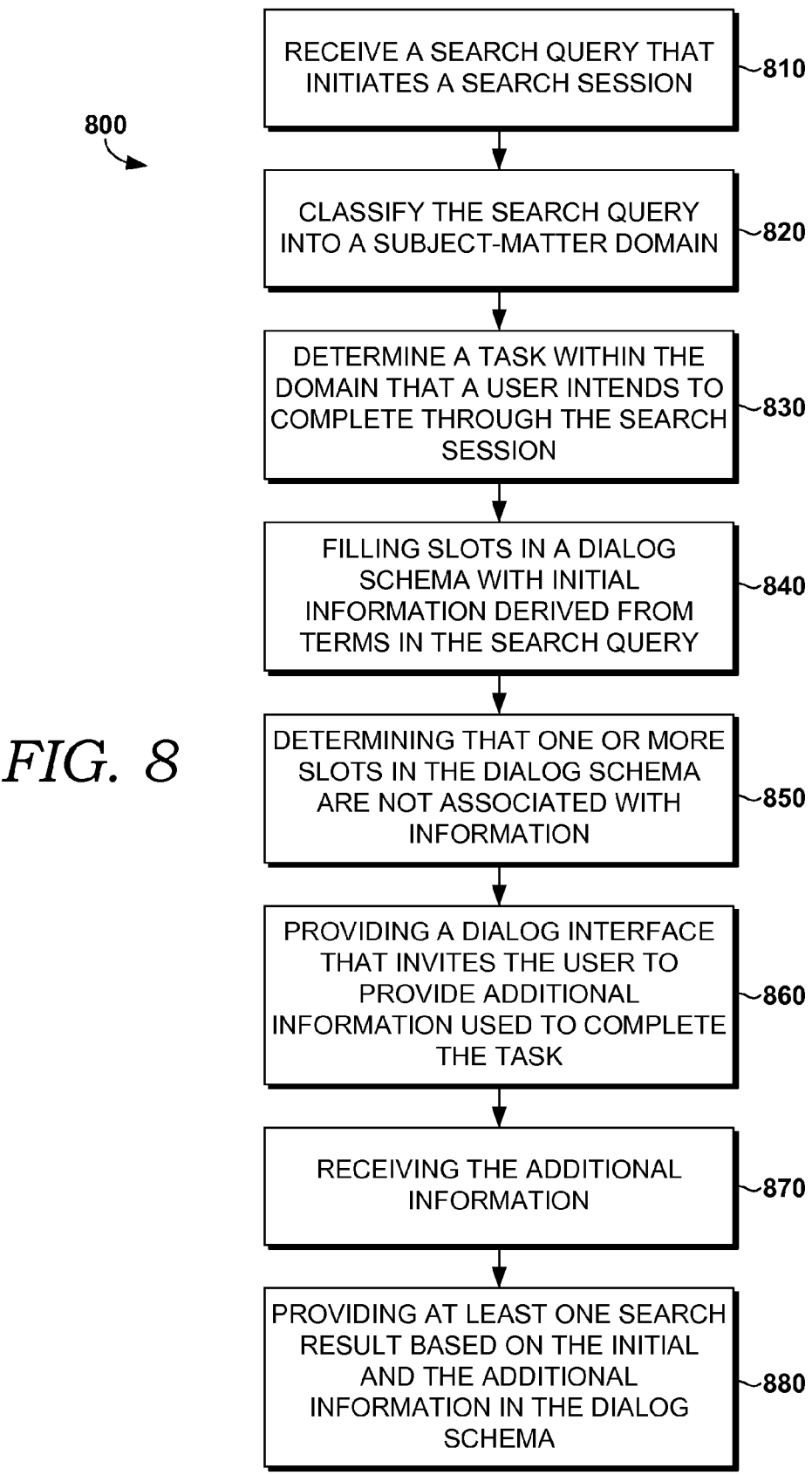
FIG. 8 is a flow diagram illustrating a method analyzing terms within a search query using a domain specific analysis, in accordance with an embodiment of the present invention.

Turning now to FIG. 8, a flow chart that illustrates a method 800 of analyzing terms within a search query using a domain specific analysis is shown, in accordance with an embodiment of the present invention. At step 810, a search query that initiates a search session is received. The search query is the first search query within a search session that may comprise multiple search queries, hence the search query "initiates" the search session. As described previously, a search session is a group of queries submitted for the purpose of completing the same task. For example, a search session may comprise a series of search inquiries directed at finding a restaurant. A search query may be submitted through an interface provided by a search engine. The method 800 may be performed by a search engine.

At step 820, the search query is classified into a subject-matter domain. A Markov model can be used to classify the search query into a domain. Once classified into a domain, at step 830, a task within a domain that a user intends to complete through the search session is determined. A task is more specific than the domain. Example tasks include making restaurant reservations, buying a movie ticket, finding show times, and booking airline travel reservations. The statistical model used to determine the task may be specific to the domain. In other words, the task determination is really a two-step process. First, classify the overall query into a domain. Second, use domain-specific classifiers to infer a task that the user is attempting to complete.

The domain-specific classifiers may use active learning to reduce human labeling efforts when generating data sets used to train the statistical model. In traditional supervised learning, a set of data examples need to be labeled by human judges for model training purposes. Traditionally, the data examples to be labeled are randomly sampled from a group of data sets. In one embodiment, during the domain-classifier training process, data examples are actively selected, rather than randomly sampled. The data examples are selected to have the biggest contribution for training the classifier. The result is that the classifier has improved performance with minimal training data.

In one embodiment, pseudo-query sequence generation is used for dialog model training In order to train the dialog model, query sequences that can be used as training data are needed. In one embodiment, query sequences are constructed for training the model by breaking long strings found in a query log into a series of shorter queries. For example a long query, such as "Book me Marriott for three nights with two adults and three kids on Friday near Boston airport" is split into a sequence of short queries, which has the same user intent: "book hotel, Marriott hotel, for three nights, we have two adults and three kids, Friday, near Boston airport." This simulates the real process when users interact with a search engine. In another embodiment, we can find some dialog conversations from the Web to construct training data. For example, the simple conversations on a learning English page can be converted into a query sequence for dialog model training This reduces the need for manual labeling.

At step 840, slots in a dialog schema are filled with initial information derived from the terms in the search query. The dialog schema comprises slots for information that is used to complete the task. The dialog schema may be specific to the particular task or more generally related to the subject-matter domain. For example, in a restaurant domain, the most common slots could include the restaurant name, restaurant type, cuisine type, menu items, location, reservation time, reservation date, party size, etc. Each slot is defined by a type of grammar. For example, the slot could be defined using a context-free grammar or regular grammar or a lexicon list. A semi-Markov conditioned-random-field ("CRF") can be used to do a sequential slot labeling for a given query. The semi-Markov CRF model may use the grammars and extracted entities from the user query to do a sequential decoding based on a Viterbi algorithm. The semi-Markov CRF is then used to assign slot labels to segments of the user query. For example, given a query, "Find a fancy French restaurant in Seattle," the semi-Markov CRF model will assign slot "cuisine-type" to French, slot "price range" to fancy, and slot "location" to Seattle and ignore other entities such as "find a" and "in." As additional dialog information or queries are received, additional slots may be filled in the same manner.

At step 850, one or more of the slots in the dialog schema are determined to not be associated with information. In other words, one or more of the slots in the dialog schema are empty. At step 860, a dialog interface is provided that invites the user to provide additional information used to complete the task and fill slots in the dialog schema. The dialog interface may ask users for information in an order in which they typically provide information within previously submitted search queries. For example, if the search query asked for flights from Seattle, the dialog might ask for a destination since that is typically the next piece of information provided.

At step 870, the additional information is received. As mentioned, once received, the additional information may be added to the dialog schema. At step 880, at least one search result is provided based on the initial and the additional information in the dialog schema. The search result is related to completing the task. The search result may be generated by a separate application. Further, the search result may be a link to an application that helps the user complete the task. For example, the user may be provided a search result that links to an application that allows the user to make a restaurant reservation. In an embodiment of the present invention, the schema data may be provided to the application when the user clicks on the link through the search result. This information may be prepopulated within the application as illustrated previously in FIGS. 5 and 6.

Once search results are provided, the user may provide additional information that is used to further refine the search results. For example, the user may provide additional dialog information or an additional search query. If an additional search query is provided, a determination as to whether a new search session is started with the query is made. If the query is for a new search session, then the process may start over with a blank dialog schema associated with the domain into which the new search query is classified.

Figure 9:
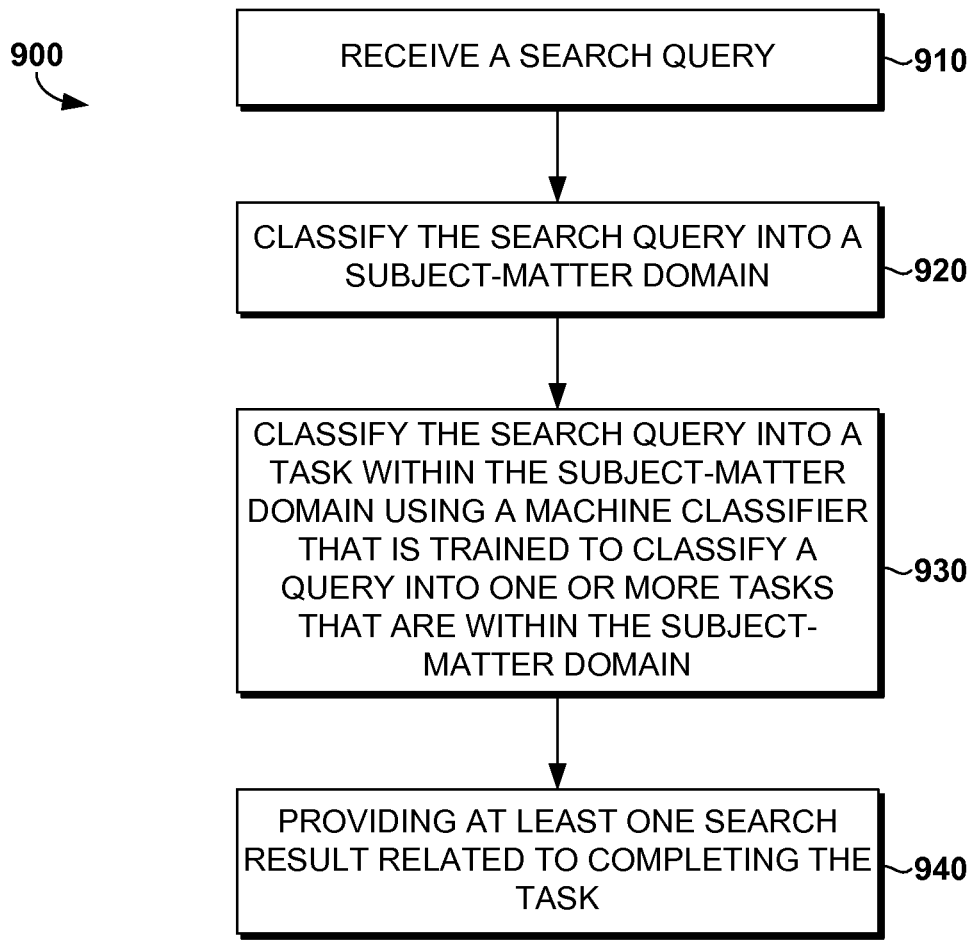
FIG. 9 is another flow diagram illustrating a method of analyzing terms within a search query using a domain specific analysis, in accordance with an embodiment of the present invention.

Turning now to FIG. 9, a method 900 of analyzing terms within a search query using a domain specific analysis is shown, according to an embodiment in the present invention. At step 910, a search query is received. As described previously, a search query may be received through a search engine. At step 920, the search query is classified into a subject-matter domain. This may be similar to the classification occurring at step 820 in FIG. 8. At step 930, the search query is classified into a task within the subject-matter domain using a machine classifier that is trained to classify a query into one or more tasks that are within the subject-matter domain.

At step 940, at least one search related to completing the task is provided. As described previously, the machine classifier used at step 930 may be specific to the domain in which the search query was initially classified. The query may be analyzed to fill slots within a dialog schema, as previously described. The information in these slots may be used to provide the search results.

Figure 10:
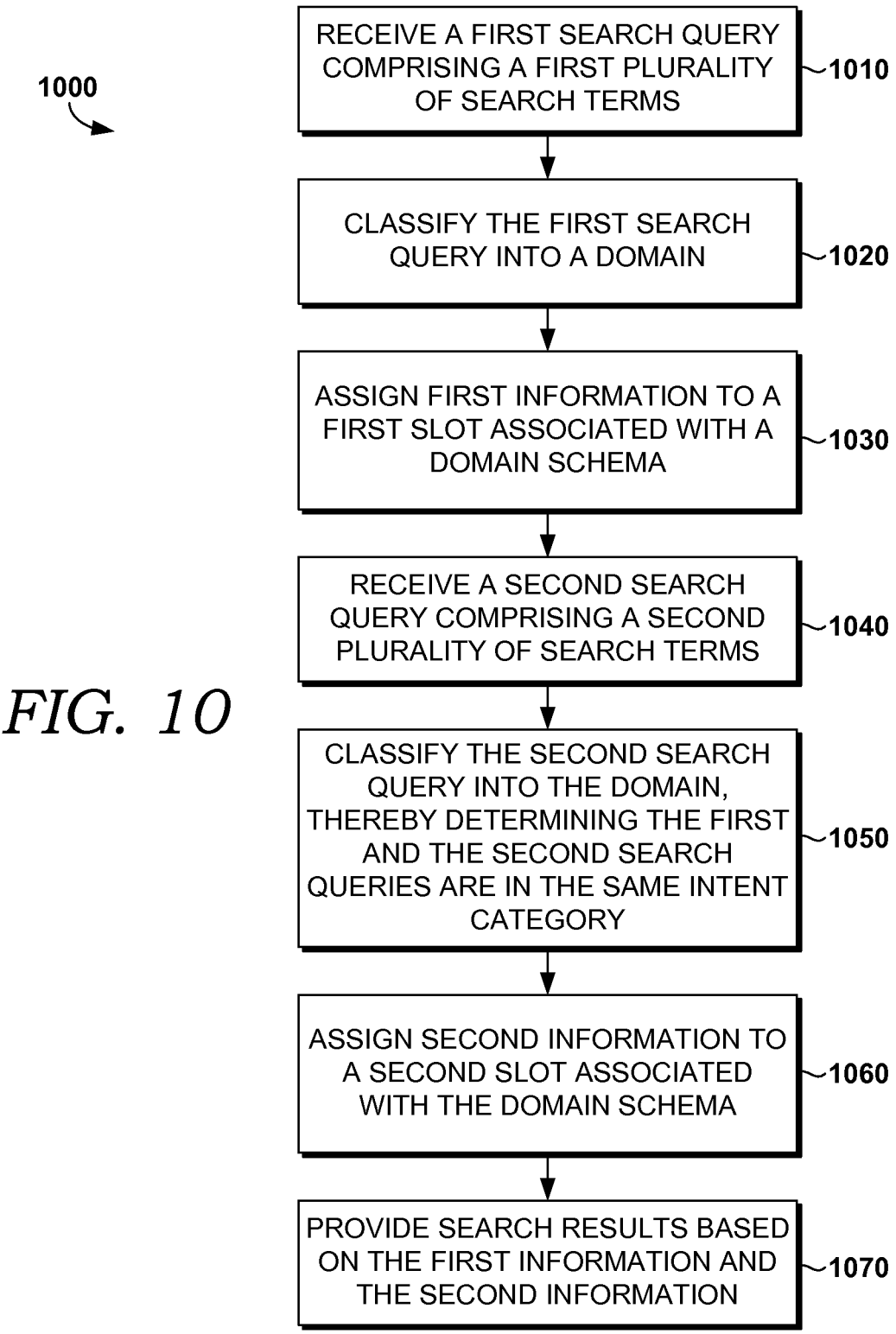
FIG. 10 is a flow diagram illustrating a method of analyzing terms within a search query using a domain specific analysis, in accordance with an embodiment of the present invention.

Turning now to FIG. 10, a method 800 of contextually analyzing terms within a search query is provided, in accordance with an embodiment of the present invention. At step 1010, a first search query comprising a first plurality of search terms is received. At step 1020, the first search query is classified into a subject-matter domain. At step 1030, first information is assigned to a first slot associated with the domain schema. The first information is based on the first plurality of search terms. The first information does not need to be an actual term within the search terms, but could instead be derived from the terms. For example, in the example given previously, a term "fancy restaurant" could be populated into the price range slot as "expensive."

At step 1040, a second search query comprising a second plurality of search terms is received. At step 1050, the second search query is classified into the domain. Accordingly, the first and the second search queries are within the same domain and part of a single search session. As described previously, the Markov model may be used to determine the domains and when a transition between different domains occurs during a series of searches. At step 1060, second information is assigned to a second slot associated with the domain schema. The second information is derived from the second plurality of terms and may be one of the terms verbatim or convey a meaning associated with the terms. At step 1070, search results are provided based on the first information and the second information. In one embodiment, the search results are not provided until after a threshold number of slots in the domain schema are filled. A domain schema may be alternatively referred to as a dialog schema.

Many different arrangements of the various components depicted, as well as components not shown, are possible without departing from the spirit and scope of the present invention. Embodiments of the present invention have been described with the intent to be illustrative rather than restrictive. It will be understood that certain features and subcombinations are of utility and may be employed without reference to other features and subcombinations and are contemplated within the scope of the claims.

The invention claimed is:

1. A computing system comprising:
   a processor; and
   computer storage memory having computer-executable instructions stored thereon which, when executed by the processor, implement a method of analyzing terms within a search query using a domain specific analysis, the method comprising:
      receiving a search query that initiates a search session;
      analyzing the search query using a statistical model to determine a subject-matter domain to be searched, wherein the subject-matter domain is determined using a statistical classifier that generates a probability that the search query is within the subject-matter domain;
      selecting the subject-matter domain having a highest probability that the search query is within the subject-matter domain;
      determining a task that a user intends to complete through the search session based on the subject-matter domain determination;
      selecting a dialog schema based upon the determined task within the determined subject-matter domain, wherein the dialog schema comprises slots for information that is used to complete the task;
      filling the slots in the dialog schema with initial information derived from terms in the search query;
      determining that one or more slots in the dialog schema are empty;
      providing a dialog feature that requests additional information to fill at least one of the empty slots in the dialog schema;
      receiving the additional information; and
      providing at least one search result based on the initial information and the additional information in the dialog schema, wherein the at least one search result is related to completing the task, and wherein the at least one search result includes a link to an application that helps the user complete the task.

2. The system of claim 1, wherein each slot is derived through an analysis of information provided by users conducting searches within the subject-matter domain previously, wherein the analysis compares n-grams in the search query with n-grams derived from entities in a domain knowledge base, wherein a match with an infrequently occurring n-gram indicates a possible match between an entity in which the n-gram is present.

3. The system of claim 1, wherein each slot contains information that is consumable by a search application to identify search results the user is seeking.

4. The system of claim 1, wherein the application comprises fields that are prefilled with the initial information and the additional information.

5. The system of claim 1, wherein the method further comprises:
   receiving one or more additional search queries;
   determining that the one or more additional search queries are part of the search session; and
   assigning further information to the empty slots in the dialog schema using terms from the one or more additional search queries.

6. The system of claim 5, wherein determining that one or more additional search queries are part of the search session comprises utilizing a Markov model.

7. The system of claim 1, wherein the dialog feature requests the additional information in an order in which people typically provide information, wherein the order is determined by performing a historical analysis of user behavior associated with the task.

8. The system of claim 1, wherein filling slots in the dialog schema with initial information derived from terms in the search query comprises utilizing a knowledge base.

9. The system of claim 1, wherein filling slots in the dialog schema comprises utilizing a semi-Markov conditioned-random field model.

10. One or more computer-storage media having computer-executable instructions embodied thereon that, when executed by a computing device, perform a method of analyzing terms within a search query using a domain specific analysis, the method comprising:
    receiving a search query;
    analyzing the search query using a statistical model to determine a subject-matter domain to be searched, wherein the subject-matter domain to be searched is identified using a statistical classifier;
    utilizing the statistical classifier to generate a probability for each subject-matter domain, the probability representing the likelihood that the search query is within a respective subject-matter domain;
    selecting the subject-matter domain to be searched by comparing the probabilities of each subject-matter domain and identifying the subject-matter domain having the highest probability that the search query is within the subject-matter domain;
    upon determining the subject-matter domain to be searched, analyzing the search query using a machine classifier to determine a task within the subject-matter domain, wherein the machine classifier is trained to analyze a query to determine one or more tasks that are within the subject-matter domain;
    selecting a dialog schema based upon the determined task within the determined subject-matter domain, wherein the dialog schema comprises slots for information that is used to complete the determined task;
    filling the slots in the dialog schema with initial information derived from terms in the search query;
    determining that one or more slots in the dialog schema are empty;
    providing a user interface with a dialog feature that requests additional information to fill at least of the empty slots in the dialog schema;
    receiving the additional information; and
    providing at least one search result related to completing the task that is based on the initial information and the additional information,
    wherein the at least one search result includes a link to an application used to complete the task.

11. The media of claim 10, wherein the slots are assigned information based on placement of the terms within the search query.

12. The media of claim 10, wherein the method further comprises communicating information extracted from the search query to the application.

13. The media of claim 10, wherein the method further comprises communicating an interface that asks for confirmation that a user intends to complete the task and suggests one or more additional tasks that have a confidence factor above a threshold that the user can select as an alternative.

14. The media of claim 10, wherein filling slots in the dialog schema with initial information derived from terms in the search query comprises utilizing a knowledge base.

15. The media of claim 10, wherein filling slots in the dialog schema comprises utilizing a semi-Markov conditioned-random field model.

16. A method of analyzing terms within a search query using a domain specific analysis, the method comprising:
receiving a first search query comprising a first plurality of search terms;
analyzing the first search query using a statistical model to determine a subject-matter domain to be searched, wherein the subject-matter domain is determined using a statistical classifier;
utilizing the statistical classifier to generate a probability for each subject-matter domain, the probability representing the likelihood that the search query is within a respective subject-matter domain;
selecting the subject-matter domain to be searched by comparing the probabilities of each subject-matter domain and identifying the subject-matter domain having the highest probability that the search query is within the subject-matter domain;
selecting a domain schema that is specific to the subject-matter domain;
assigning a first information to a first slot associated with the domain schema, wherein the first information is based on the first plurality of search terms;
receiving a second search query comprising a second plurality of search terms;
upon analyzing the second search query, determining the subject-matter domain to be searched by the second search query is the same subject-matter domain to be searched by the first search query, thereby determining the first search query and the second search query are part of a single search session;
assigning a second information to a second slot associated with the domain schema, wherein the second information is derived from the second plurality of search terms; and
providing search results based on the first information and the second information.

17. The method of claim 16, wherein the first and second slots are within a dialog schema that comprises a set of slots.

18. The method of claim 17, wherein the method further comprises:
determining that a third slot within the dialog schema is empty;
providing a dialog feature that requests information to fill the third slot;
receiving a response to the dialog feature; and
assigning third information to the third slot, wherein the third information is derived from the response, and wherein the search results are also based on the third information.

19. The method of claim 17, wherein the search results are not provided until after a threshold number of slots of the dialog schema are filled.

20. The method of claim 16, wherein the first information is generated by comparing the first plurality of search terms with a knowledge base to disambiguate a term.

* * * * *